United States Patent [19]

Rogers

[11] 4,405,461

[45] Sep. 20, 1983

[54] CONTROL OF SILICA SCALING IN INDUSTRIAL PROCESSES

[76] Inventor: Alfred N. Rogers, 5333 Mallard Dr., Pleasanton, Calif. 94566

[21] Appl. No.: 362,225

[22] Filed: Mar. 26, 1982

[51] Int. Cl.³ .............................................. C02F 5/12
[52] U.S. Cl. ................................... 210/698; 252/180; 549/472; 549/494; 564/503; 564/507; 564/511
[58] Field of Search ...................... 564/503, 507, 511; 210/698; 252/180; 549/472, 494

[56] References Cited

U.S. PATENT DOCUMENTS 2,175,585  10/1939  Adkins et al. ....................... 549/472
4,032,460   6/1977  Zilch et al. ......................... 252/180

*Primary Examiner*—John E. Kittle
*Assistant Examiner*—Robert A. Wax
*Attorney, Agent, or Firm*—John L. McGannon

[57] ABSTRACT

A method and product for use in controlling the deposition of silica-containing scales and their adhesion to the walls of piping and other plant components. The product is an amine to which is attached at least a pair of terminal groups. Each group is selected from the family of compounds consisting of furfuryl and a saturated or unsaturated hydrocarbon radical substituted with one or more members selected from hydroxy and carboxy, or a hydrohalide thereof. The method includes injecting the additive into saline brine or brackish water containing silica which may tend to precipitate as a scale.

12 Claims, No Drawings

CONTROL OF SILICA SCALING IN INDUSTRIAL PROCESSES

BACKGROUND OF THE INVENTION

Natural waters and some aqueous waste streams contain appreciable quantities of dissolved silica which, during processing of the water, plate out as scales on the piping and the walls of the plant. It had not been possible to date to control silica scaling by the injection of additives, a technique which has been used successfully for other types of scaling compounds found in water and brines.

Scaling problems exist in the cooling systems of power plants where deposits of scale not only lower the heat transfer rate of vapor condensers but also impair the operability of the components and controls of the cooling systems. Scaling by silica and other scalants is a serious problem in the cooling towers of power plants.

In the desalination of sea water and brackish water, a deposit of scale interferes with the effective operation of the plant and may completely vitiate some of the plant components. This is particularly true in membrane processes, such as reverse osmosis and electrodialysis, where deposits of silica and other scales can clog the system and destroy the operability of the membranes.

SUMMARY OF THE INVENTION

The present invention concerns the injection into silica-containing waters and brines of one of a class of chemical compounds which are capable of decreasing to a great extent the deposition of silica-containing scales and their adhesion to the walls of piping and other plant components. This scale control action is achieved by the addition of comparatively small concentrations of such chemical compounds, in the range of 0.1 to 20 parts per million by weight of the brine.

The additive of this invention includes an amine comprised generally as follows:

$$\left[ \begin{array}{c} R^1 \\ \phantom{R}\diagdown \\ \phantom{RR}N-(CH_2)_m \\ \phantom{R}\diagup \\ R^2 \end{array} \right]_n H_p$$

where: $m=0$ or $1$, $n=1$ or $2$ such that $m=1$ when $n=2$, $p=0$ or $1$ such that $p+n=2$, $R^1$ and $R^2$ are the same or different and are selected from the group consisting of furfuryl and a saturated or unsaturated hydrocarbon radical substituted with one or more members selected from hydroxy and carboxy, or a hydrohalide thereof.

A first embodiment of the additive of the present invention is comprised of ethylene diamine to which are attached four terminal groups as follows:

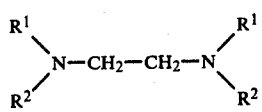

where each of $R^1$ and $R^2$ can consist of polyhydroxy organic compounds having a chain length of from four to 16 carbon atoms. As an example, $R^1$ or $R^2$ can consist of gluconic acid or furfuryl.

As a second embodiment, the additive can be a secondary amine comprised of

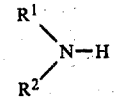

where $R^1$ and $R^2$ can be a polyhydroxy straight-chain hydrocarbon comprising 12 to 17 carbon atoms. In the alternative, $R^1$ or $R^2$ can be a straight-chain fatty acid, saturated or unsaturated, comprising of from four to 10 carbon atoms and joined to the alpha carbon atom of the fatty acid.

As a third embodiment, the additive can be a quaternary amine comprised of

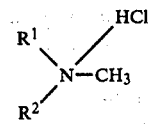

where $R^1$ and $R^2$ can be as described above with respect to the second embodiment.

The compounds described herein are prepared by methods well known in the art, and their preparation does not constitute a part of this invention.

In the practice of the invention, the compounds specified above are injected, either as pure compounds or as solutions, into the silica-containing water or brine.

In the use of the present invention in a desalination process, the additive is injected into the liquid stream ahead of the point at which the temperature and concentration of the fluid will induce the start of precipitation of scale. The same criterion applies to the use of the present invention in other processes where scaling and, in particular, silica scaling is anticipated.

The method of this invention provides three advantages, the exact manner of its functioning depending on the temperature and composition of the fluid being processed and the temperature, pressure, and concentration regime of the process:

1. It retards the inception of the precipitation so that the fluid is discharged from the equipment prior to the start of scale formation.
2. Any precipitate which does form in the system is prevented from adhering to the pipes and equipment but, instead remains in suspension.
3. Under certain conditions, the invention prevents the formation of silica scale entirely.

What is claimed is:

1. A method of controlling silica scaling in lines and plant equipment through which silica-containing water or brine flows comprising: providing an additive formed from

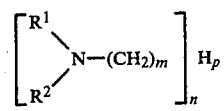

where $m=0$ or $1$, $n=1$ or $2$ such that $m=1$ when $n=2$, $p=0$ or $1$ such that $p+n=2$, $R^1$ and $R^2$ are the same or different and are selected from the group consisting of furfuryl and a saturated or unsaturated hydrocarbon radical substituted with one or more members selected from hydroxy or a hydrohalide thereof; and directing the additive into silica-containing water or brine.

2. A method as set forth in claim 1, wherein the directing step is performed before the brine is subjected to conditions which will cause the precipitation of silica.

3. A method as set forth in claim 1, wherein the directing step includes injecting the additive into the brine before the brine flashes.

4. A method as set forth in claim 1, wherein the directing step includes injecting the additive into a flow of brine ahead of the location along the flow at which the temperature and concentration of the brine will induce the start of precipitation of scale.

5. A method as set forth in claim 1, wherein $R^1$ or $R^2$ includes gluconic acid.

6. A method as set forth in claim 1, wherein $R^1$ or $R^2$ includes furfuryl amine.

7. A method as set forth in claim 1, wherein one of $R^1$ includes gluconic acid and $R^2$ includes furfuryl amine.

8. A method as set forth in claim 1, wherein the concentration of said additive is in the range of 0.1 to 20 parts per million by weight of the brine.

9. An additive to minimize scaling in geothermal brine comprising: a compound formed from

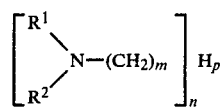

where m=0 or 1, n=1 or 2, p=0 or 1 such that p+n=2, $R^1$ and $R^2$ are the same or different and are selected from the group consisting of furfuryl and a saturated or unsaturated hydrocarbon radical substituted with one or more members selected from hydroxy or a hydrohalide thereof.

10. An additive as set forth in claim 9, wherein $R^1$ or $R^2$ includes gluconic acid.

11. An additive as set forth in claim 9, wherein $R^1$ or $R^2$ includes furfuryl amine.

12. An additive as set forth in claim 9, wherein $R^1$ includes gluconic acid and $R^2$ includes furfuryl amine.

* * * * *